May 28, 1957 R. W. CANNON 2,793,581
EGG HANDLING AND TURNING DEVICE
Filed June 18, 1954 2 Sheets-Sheet 1
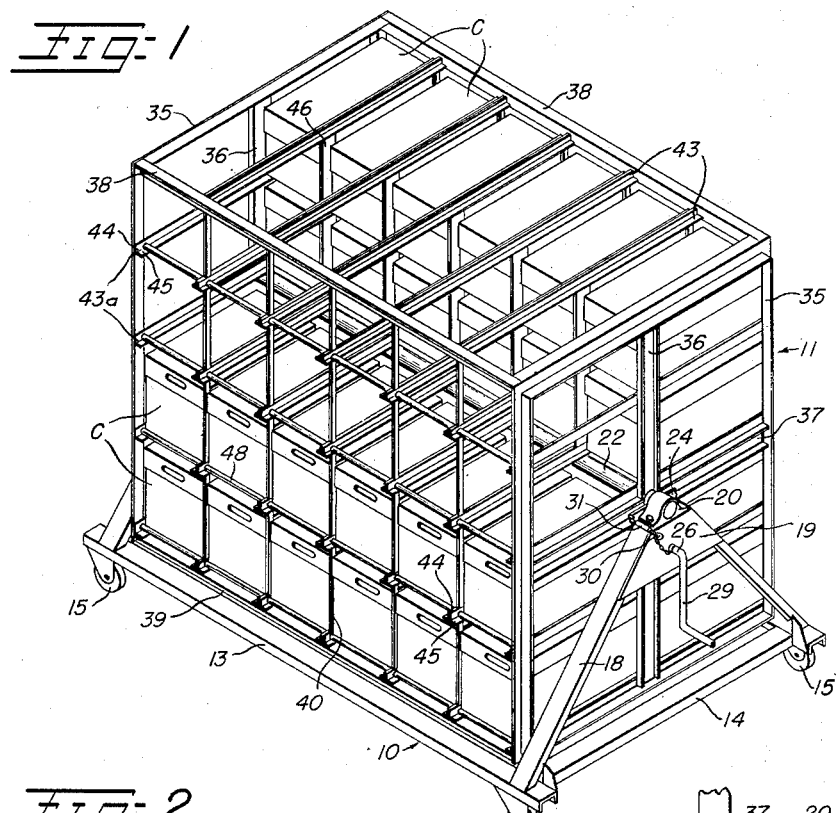
Fig. 1
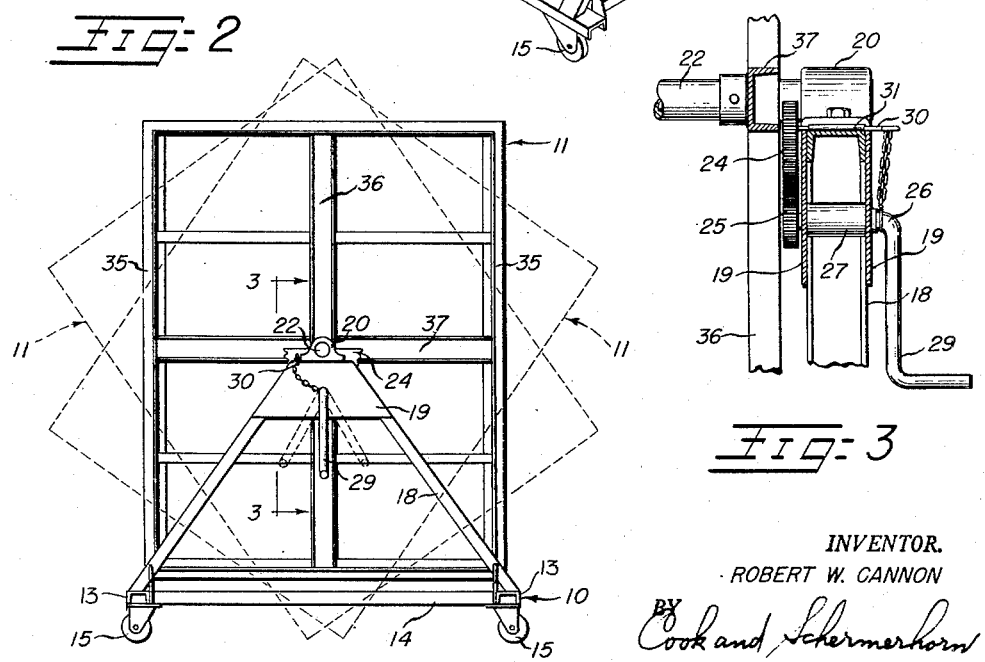
Fig. 2
Fig. 3
INVENTOR.
ROBERT W. CANNON
BY Cook and Schermerhorn
ATTORNEYS May 28, 1957 R. W. CANNON 2,793,581
EGG HANDLING AND TURNING DEVICE
Filed June 18, 1954 2 Sheets-Sheet 2

INVENTOR.
ROBERT W. CANNON
BY Cook and Ackermanhorn
ATTORNEYS

United States Patent Office 2,793,581
Patented May 28, 1957

2,793,581

EGG HANDLING AND TURNING DEVICE

Robert William Cannon, Canby, Oreg., assignor to R. W. Cannon & Co., Inc., Salem, Oreg., a corporation of Oregon Application June 18, 1954, Serial No. 437,695

1 Claim. (Cl. 99—242)

This invention relates to improvements in egg handling and turning devices.

In commercial hatcheries, eggs used for hatching often must be stored in large quantities while awaiting incubation, and to maintain the hatching qualities of such eggs systematic care thereof is essential. It is necessary to turn the eggs at frequent intervals so that the yolks will not settle through the albumen and come into contact with the shell. Such operations often are conducted on a large scale and storage equipment heretofore available for holding the eggs prior to incubation has proven to be inadequate for large scale operations. The equipment heretofore in use required that eggs be placed individually in a storage rack, which seriously slowed down this phase of egg handling. Furthermore, placing eggs individually in a storage rack necessitates individual handling in removing them from the rack, plus another handling to place them in the incubator, increasing labor costs and reducing the hatchability of the eggs.

A preferred egg handling system has been found to comprise the following steps. Eggs are gathered every hour and cleaned thoroughly, and precooled at least twelve hours before being inserted in egg cases. The eggs are preferably cased in moist cases. After casing the eggs, the cases are then stored in a holding room at a temperature of about 45° F., but not exceeding 50°, a preferred moisture content of the atmosphere of the holding room being 80–85%. The eggs are turned every twelve hours through an angle of 70 degrees to prevent the yolks from settling through the albumen as described above. It has been found that eggs thus treated can be stored up to thirty days without impairment of their hatching qualities, and for greater lengths of time than thirty days with only slight decline in the hatching qualities thereof.

It is, therefore, an important object of the present invention to provide an improved egg handling and turning device which has means effectively to assist in carrying out the steps of the improved method of handling and storing eggs prior to incubation.

It is another object to provide an improved egg handling and turning device which has means to receive whole egg cases to dispense with individual handling of the eggs and for decreasing labor costs as well as maintaining hatching qualities over a period of time.

Another object of the invention is to provide an egg handling and turning device adaptable for large scale operations but occupying a minimum of space.

Another object is to provide an egg handling and turning device having a wheeled base so that the device is movable readily from place to place to load or unload the same.

A further object is to provide a handling and turning device for eggs having improved means for turning the eggs accurately to predetermined angular positions while in storage to prolong hatching qualities of the eggs.

In general, the device comprises a storage rack having improved structure to receive whole egg cases and being mounted on a mobile base structure. Means are provided in the device for rotating the rack relative to the base between two extreme positions to tilt the cases and eggs therein to predetermined angular positions for reasons hereinabove explained. At each extreme angular position of the rack, one edge of the rack is adapted to engage the floor and rest thereon to insure a constant angular position at each of two extreme positions.

The foregoing and other objects and advantages of the invention will become apparent and the invention will be bettter understood from the following specification describing preferred embodiments which are illustrated in the accompanying drawings. It is to be understood, however, that various changes may be made in the construction and arrangement of parts, and that certain features may be used without others, without departing from the spirit of the invention.

In the drawings:

Figure 1 is a perspective view of a preferred form of the present egg handling and turning device;

Figure 2 is an end elevation view of the device, showing in dotted lines the two opposite angular positions thereof;

Figure 3 is a fragmentary sectional view showing crank means to turn the storage rack relative to the wheeled base, taken on the line 3—3 of Figure 2;

Figure 5:
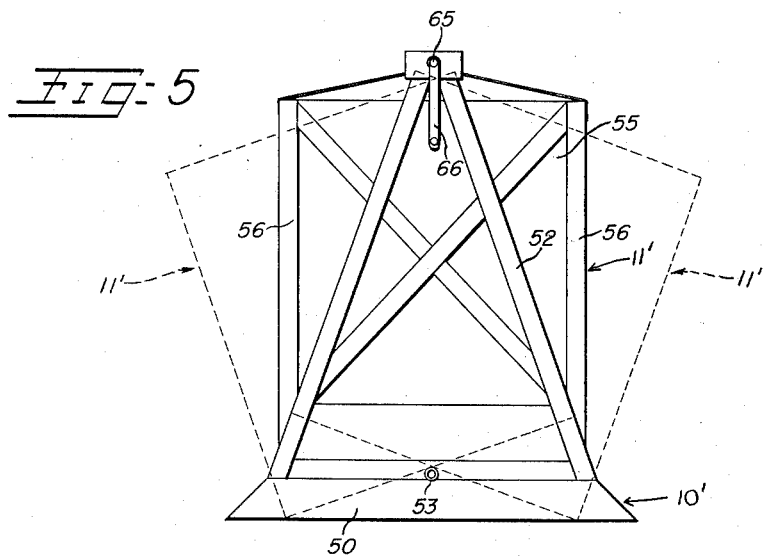
Figure 5 is an end elevation view of the Figure 4 embodiment, showing in dotted lines the two extreme angular positions thereof.

Referring to the drawings, Figures 1–3 show a preferred form of the device which comprises, in general, a base frame 10 and a rack structure 11 mounted on the base for carrying a plurality of egg cartons C. Base member 10 preferably comprises a rigid framework constructed of side channel bars 13 and end channel bars 14, the central area intermediate the bars 13 and 14 being free of any obstructing frame members. Casters 15 are mounted on the base 10 and the device may be moved conveniently from place to place.

Secured adjacent each end of the base 10 is an A-frame structure 18 reinforced adjacent the upper end thereof by web plates 19. Mounted at the apex of each A-frame 18 is a bearing 20, and extending between said bearings and journaled therein is a shaft 22 which supports the egg rack 11. A gear segment 24 is secured to the shaft 22 adjacent one end thereof and engages a pinion gear 25 mounted on a shaft 26 which is journaled in a bearing 27 secured between web plates 19. Shaft 26 is formed into a crank handle 29 whereby shafts 26 and 22 can be rotated by means of the crank 29 and gears 24 and 25 when desired. A latch bolt 30 slidable through a latch housing 31 secured to the A-frame 18 is adapted to engage a bore in the gear segment to hold the segment, as well as the shaft 22 and rack 11, in any selected position of rotation.

Rack 11 comprises end frames 35 which are preferably formed from angle or channel bars and which are reinforced by central vertical and horizontal channel bars 36 and 37, respectively. The two end frames 35 are connected together at the top and bottom by longitudinal angle bars 38 and 39, respectively, and secured between the top and bottom bars 38 and 39 on the front and rear of the rack are spaced vertical supporting bars 40.

Secured to the bars 38 and 39 at the top and bottom, respectively, and to the bars 40 intermediate the bars 38 and 39 in predetermined spaced relation from top to bottom, are horizontal frame members 43. The frame members, spaced between the end frames 35, each comprise a pair of angle bars disposed in a common plane and secured in position so as to provide a vertical guide flange 44 and a pair of oppositely extending horizontal flanges 45 for supporting egg cartons C. A preferred form of construction is to secure one of the pair of frame members 43 on one side surface of the bars 40 and the other frame member on the opposite side surface of bars 40 to provide a vertical guide flange 44 and a supporting flange 45 on each side surface of bars 40. Frame members 43a, disposed in a common plane with frame members 43, are secured to end frames 35 and comprise single angle bars, these bars also having a vertical guide flange 44 and a horizontal supporting flange 45. Vertical support members 46 are secured to the frame members 43 intermediate their ends to provide central support therefor.

Mounted across the front of the rack adjacent the ends of the frame members 43 are rollers 48, the top edges of the rollers being spaced above the supporting surfaces of flanges 45. The structure described forms a plurality of bins adapted to receive whole egg cases C. Individual cases are readily inserted in the bins by supporting one end thereof on rollers 48 and then moving them inwardly until the trailing end drops inside of the rollers, the cases being supported by flanges 45 and being prevented from outward movement by the rollers 48 which engage the end surfaces of the cases and hold them in the bins. To remove a case of eggs from a bin, the front end thereof must first be raised and the case pulled slightly outwardly to rest on a roller 48, whereupon it can then be easily rolled out of the bin.

As hereinbefore stated, the entire rack framework 11 is rotatable with shaft 22 relative to the base 10, and, as seen in dotted lines in Figure 2, the rack is rotatable between two extreme angular positions. In each of the extreme angular positions a portion of the rack rotates through the opening intermediate the base frame members 13 and 14 and a bottom edge of the rack engages the floor. An important advantage of this structure is that a portion of the weight of the loaded rack can be supported by the floor to take some strain off the rack and base structure in the two extreme angular positions. Another important advantage is that identical angular positions can be achieved each time the rack is rotated, whereby the eggs are turned to the desired and consistent angle in each position.

Although the present device may be constructed of any desired size, the rack structure shown in Figure 1 measures 58 inches wide, 74½ inches high and 93½ inches long (over-all measurements) and is adapted to receive forty-eight egg cases. It is thereby evident that the device provides for mass storage and turning facilities for eggs awaiting incubation, and individual handling of the eggs is unnecessary. The entire device can be rolled conveniently out of storage onto a loading platform to receive egg cases and then rolled back into storage. While in storage the rack is rotated from one angular position to the other every twelve hours for best results, the eggs being firmly seated in the cases to prevent any movement relative to each other and to the egg case itself. There is thus no possibility of breakage, and each egg will be turned through an optimum number of degrees each time the rack is rotated. Furthermore, to make the operation automatic, a powered turning mechanism activated by an electric clock timer may be used in place of the hand crank, further to reduce manual attention.

Figure 4:
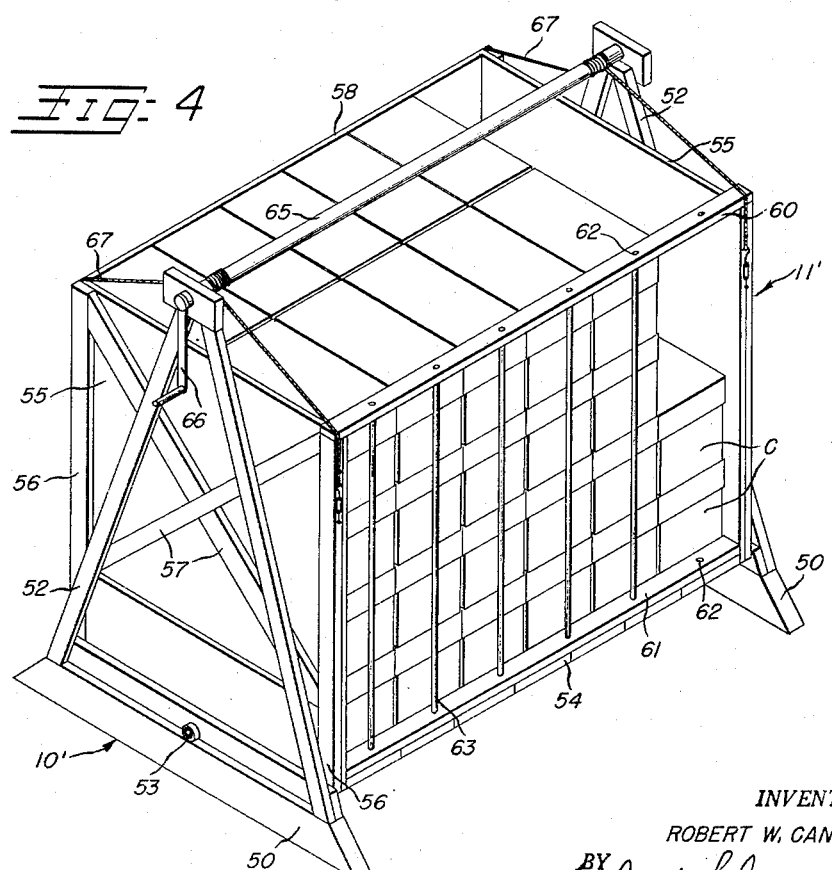
Figure 4 is a perspective view of a modified form of the invention.

The other embodiment, shown in Figures 4 and 5, employs a base frame 10' and a rack structure 11'. Base frame 10' comprises bottom frame members 50, each supporting an A-frame structure 52. Rotatably mounted between the frame members 50 is a shaft 53 which rotatably supports the rack 11'. Rack 11' comprises a bottom wall 54, end walls 55 reinforced by vertical frame members 56 and diagonal members 57, and a back wall 58, the front of the rack being open. The end walls 55 of the rack 11' are connected together at the front of the rack by top and bottom longitudinal frame members 60 and 61, respectively, these members being provided with spaced holes 62 to receive removable vertical rods 63. Egg cases C are stacked in the rack, one upon the other, and are prevented from longitudinal movement by vertical rods 63 extending between members 60 and 61 and mounted in the holes 62, the rods 63 being removed when it is desired to load and unload egg cases.

The base 10', similar to the Figure 1 embodiment, is free of any central framework, and, as seen in Figure 5, the rack 11' is free to rotate on the shaft 53 to the dotted line positions shown. In each of the extreme angular positions of the rack, as shown in dotted lines, one of the bottom edges is adapted to engage the floor surface to insure identical positions of tilt and to remove some of the weight from the rack and base. Rack 11' is caused to rotate on shaft 53 by a windlass comprising a transverse shaft 65 rotatably mounted between the apices of the A-frames 52 and having a crank 66 on one end. Ropes or chains 67, having their ends secured to the rack 11', are wrapped around the shaft 65 for turning the rack upon rotation of the shaft.

The present invention thus provides means for conveniently handling, turning and storing eggs prior to incubation, and, although designed principally for large scale operations, it can be constructed of any desired size for large or small scale operations. While in storage the entire rack can be easily turned at the required intervals to the proper angular position, thus reducing labor costs and at the same time improving hatchability of the eggs.

Having now described my invention and in what manner the same may be used, what I claim as new and desire to protect by Letters Patent is:

A portable, mobile device for handling and turning a heavy load of egg cases and the like comprising an open rectangular wheeled base frame, upright end frames on opposite ends of said base frame, a shaft mounted in bearings in said end frames, a segment gear fixed on said shaft, a pinion journaled in one of said end frames in meshing engagement with said gear for rotating said gear and shaft, means to lock said gear in adjusted position, a rigid rack supported by said shaft for rotative movement therewith between said end frames, said rack having bottom corners projecting through said base frame and engageable with a floor when the rack is tilted in opposite directions, a plurality of tiers of slide tracks in said rack forming egg case compartments in the rack accessible from opposite sides of the rack, and a horizontal roller extending across the outer end of each compartment slightly above track level for rolling cases into and out of the compartments, said rollers forming stops to hold the cases in the compartments when the rack is tilted.

References Cited in the file of this patent

UNITED STATES PATENTS

| | | |
|---|---|---|
| 1,480,233 | Oberstadt | Jan. 8, 1924 |
| 1,627,141 | Bogan | May 3, 1927 |
| 1,918,585 | Biggins | July 18, 1933 |
| 2,274,640 | Smith | Mar. 3, 1942 |

FOREIGN PATENTS

| | | |
|---|---|---|
| 175,711 | Germany | Oct. 6, 1906 |